(12) United States Patent
Andersen et al.

(10) Patent No.: US 6,768,893 B1
(45) Date of Patent: Jul. 27, 2004

(54) SPARE ADF SCAN WINDOW STORAGE

(75) Inventors: Eric L. Andersen, Meridian, ID (US); Paul K. Mui, Boise, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/365,377

(22) Filed: Feb. 12, 2003

(51) Int. Cl.[7] .............................................. G03G 15/00
(52) U.S. Cl. ..................................................... 399/367
(58) Field of Search ................................ 399/367, 368, 399/369, 370, 371, 372, 373, 374, 375, 213; 355/128, 129, 130, 131

(56) References Cited

U.S. PATENT DOCUMENTS

| | | | |
|---|---|---|---|
| 3,588,106 A | 6/1971 | Csaba | |
| 5,227,226 A | 7/1993 | Rzasa | |
| 6,042,283 A | 3/2000 | Koyabu et al. | |
| 6,241,407 B1 * | 6/2001 | Huggins et al. | |
| 6,293,469 B1 | 9/2001 | Masson et al. | |

FOREIGN PATENT DOCUMENTS

JP       08046742 A  *  2/1996  .......... G03G/15/00

* cited by examiner

*Primary Examiner*—Arthur T. Grimley
*Assistant Examiner*—Ryan Gleitz (57) ABSTRACT

Representative embodiments provide for an automatic document feeder including a housing and a cover supported by the housing. The cover and the housing are configured to define a storage compartment, and the storage compartment is configured to removably store at least one scan window, wherein the at least one scan window is configured for use with the automatic document feeder. A method of using the present invention includes storing a replacement scan window within a storage compartment, removing an existing scan window from an operational location of an automatic document feeder, retrieving the replacement scan window from the storage compartment, and installing the replacement scan window in the operational location of the automatic document feeder.

26 Claims, 5 Drawing Sheets

SPARE ADF SCAN WINDOW STORAGE

BACKGROUND

Automatic document feeders are known in the art. Generally, an automatic document feeder is configured to transport and guide sheet media from an input tray, through a scanning region, and onto an output tray. As the sheet media passes through the scanning region, it is scanned by an optical scanner typically underlying the automatic document feeder. The optical scanner produces signals corresponding to any images or indicia that are borne by the sheet media. The signals can then be further processed and/or used in a variety of ways, such as, for example, stored as image data in a computer readable media, reproduced on other sheet media, incorporated with other images or indicia within a computer-generated document, etc.

Some automatic document feeders make use of a scan window within the scanning region, which is generally formed of a transparent strip of material, such as Mylar®. (Mylar® is a registered trademark of the E. I. Du Pont de Nemours and Company Corp., of Wilmington, Del.) The scan window is typically supported within the automatic document feeder so as to complete the paper path of the moving sheet media (for example, paper) past the optical scanner during the scanning process, wherein the scan window is disposed between the passing sheet media and the optical scanner. Thus, the optical scanner scans (or reads) the image content of the sheet media through the transparent material of the scan window.

The scan window within such an automatic document feeder generally incurs scratches and/or other substantially permanent damage to its transparent material over the course of its useful life, due to the contactive nature of guiding the scanned sheet media. Scratches and other similar damage to the scan window can result in poor fidelity or errors in the signals generated by the optical scanner, leading to unsatisfactory performance. Furthermore, this unsatisfactory performance tends to escalate over time, as damage to the scan window typically increases with use. Thus, it is generally necessary for a user to replace the existing scan window of an automatic document feeder with a new, undamaged scan window from time to time in order to maintain acceptable performance of the optical scanner.

SUMMARY

One embodiment provides for an automatic document feeder, including a housing and a cover supported by the housing. The cover and the housing are configured to define a storage compartment, which is configured to removably store at least one scan window. The at least one scan window is configured for use with the automatic document feeder.

Another embodiment provides for a document scanner, including an automatic document feeder that includes an operative scan window, and a storage compartment defined by the document scanner. The storage compartment is configured to non-damagingly, removably store at least one replacement scan window, wherein the at least one replacement scan window is configured to selectively replace the operative scan window.

Still another embodiment provides for a multi-function printer, including a document scanner that includes an automatic document feeder, and an operative scan window supported within the automatic document feeder. The multi-function printer also includes a storage compartment defined by the multi-function printer, wherein the storage compartment is configured to non-damagingly removably store at least one replacement scan window. The at least one replacement scan window is configured to selectively replace the operative scan window supported within the automatic document feeder.

Yet another embodiment provides for a method for use with an automatic document feeder, including the steps of storing a replacement scan window within a storage compartment of the automatic document feeder, and removing an existing scan window from an operational location of the automatic document feeder. The method also includes retrieving the replacement scan window from the storage compartment, and installing the replacement scan window in the operational location of the automatic document feeder.

These and other aspects and embodiments will now be described in detail with reference to the accompanying drawings, wherein:

DETAILED DESCRIPTION

As described above, prior art scan windows used in Automatic Document Feeder (ADF) units can become damaged during use, and may require replacement. When this occurs, a user will frequently not have a spare scan window on hand, thus requiring that one be ordered and shipped to the user. While a replacement scan window is being shipped to the user, the scanner may be unavailable due to inoperability of the scan window that is being replaced. Thus, a user may pay a premium in shipping charges to obtain quicker delivery of the replacement scan window. If a user keeps a spare scan window on hand, the user may not remember where the spare scan window has been stored. Further, the spare scan window may become damaged while being stored if it is not stored properly. Embodiments of the present invention, described below, address these problems by providing a spare scan window or windows which are securely stored and readily accessible to a user of an ADF unit.

In representative embodiments, the present teachings provide methods and apparatus for storing one or more spare (i.e., replacement) scan windows in a storage compartment that is defined within or supported by the ADF unit, or an associated optical scanner or imaging apparatus, making the overall scan window replacement process less burdensome for the user.

Figure 1:
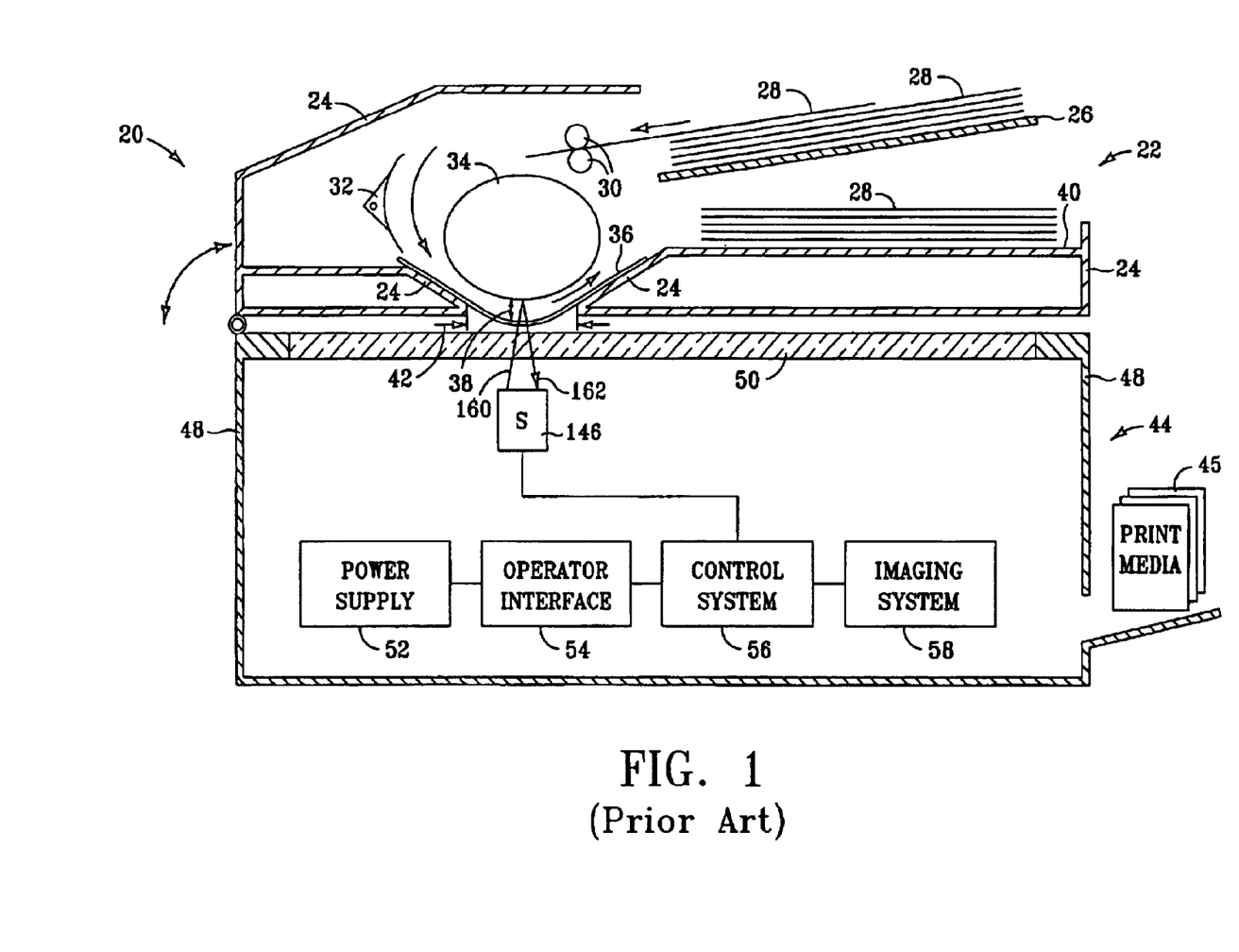
FIG. 1 is a side elevation sectional view depicting an imaging apparatus in accordance with the prior art.

Turning now to FIG. 1, a side elevation sectional view depicts an imaging apparatus 20 in accordance with the prior art. The imaging apparatus 20 includes an automatic document feeder 22. The automatic document feeder (ADF) 22 includes a housing 24, which is configured to support a plurality of ADF 22 components described hereafter. The ADF 22 includes an input tray 26 which is supported by the housing 24. The input tray 26 supports a plurality (i.e., a stack) of sheet media 28. The sheet media 28 is any suitable image-bearing media, such as, for example, paper or clear projection media.

The ADF 22 further includes a pair of transport rollers 30, which cooperate under motor propulsion (not shown) to transport individual sheets of media 28 from the input tray 26 through the balance of the ADF 22. The automatic document feeder 22 further includes a curved guide 32. The curved guide 32 is supported by the housing 24, and is configured to guide the individual sheet media 28, arriving from the transport rollers 30, onward through the ADF 22.

The automatic document feeder 22 further includes a media guide 34 that is supported by the housing 24 of the ADF 22. The automatic document feeder 22 also includes a scan window 36. The scan window 36 is supported by the housing 24 in spaced adjacency to the media guide 34, such that a passage gap 38 is defined there between. The scan window 36 can be formed form any suitable transparent, pliable material. One such material that is commonly used to form the scan window 36 is manufactured under the trade name Mylar®. Mylar® is a registered trademark of the E. I. Du Pont de Nemours and Company Corp., of Wilmington, Del. Additionally, the housing 24 defines a scan gap 42 that generally underlies, and is bridged by, the scan window 36.

The media guide 34 and the scan window 36 cooperate to guide the sheet media 28, arriving from the curved guide 32, though the passage gap 38. The ADF 22 also includes an output tray 40, which is supported by the housing 24. The output tray 40 receives the sheet media 28 after it is guided through the passage gap 38 by way of the curved guide 32, the media guide 34, and the scan window 36.

The imaging apparatus 20 further includes an imaging device 44. The exact form of the imaging device 44 is not crucial to purposes herein, and can be defined by a variety of devices known to those of skill in the imaging arts, such as, for example, a multi-function printer or a copying machine. The imaging device 44 can be any suitable device that is cooperative with the ADF 22 and is usable to form images on sheet media, thereby producing print media 45.

The imaging device 44 includes an optical scanner 46. The optical scanner 46 is supported by an imager housing 48 of the imaging device 44, and is generally disposed in underlying alignment with the scan window 36 of the automatic document feeder 22. The imaging device 44 further includes a scan bed 50. The scan bed 50 is supported by the imager housing 48 and is disposed between the optical scanner 46 and the scan window 36. The scan bed 50 can be formed from any suitable optically transparent material, and is typically formed from glass.

As shown, the imaging device 44 further includes a plurality of exemplary subsystems, including a power supply 52, an operator interface 54, a control system 56, and an imaging system 58, which are cooperatively coupled in electrical, signal, and mechanical communication with each other and with the optical scanner 46 as needed for normal operation of the imaging device 44, such as the production of the print media 45. When the imaging apparatus 20 is not provided with an imaging system 58 for printing sheets of sheet media, then the imaging apparatus acts as a stand-alone document scanner.

Typical operation of the imaging apparatus 20 is as follows: Sheet media 28 are drawn from the input tray 26, one sheet at a time, and moved by the transport rollers 30. The individual sheet media 28 are guided through the passage gap 38 by cooperation of the curved guide 32, the media guide 34, and the scan window 36. While the sheet media 28 passes through the scan gap 38, the optical scanner 46 emits a beam of light 60 toward the media guide 34. The beam of light 60 passes through the scan bed 50, the scan gap 42, and the scan window 36, where it contacts the passing sheet media 28 and is reflected therefrom as an image beam 62, which is directed back toward the optical scanner 46. The image beam 62 includes image content corresponding to the images or indicia borne by the passing sheet media 28. The optical scanner 46 detects the image beam 62 and generates electrical scan signals corresponding to the image content of the image beam 62. As shown in FIG. 1, the scan signals generated by the optical scanner 46 are then electrically coupled to the control system 56 and imaging system 58, as needed, for further use or processing such as, for example, incorporation with the images and indicia formed on the print media 45.

The typical operation of the imaging apparatus 20 described above is usually repeated for each sheet of media 28 resting on the input tray 26, until all of the sheets 28 resting thereon have passed through the ADF 22, having their respective image contents detected (i.e., scanned) by the optical scanner 46. In this way, a document that includes several individual sheets of media 28 can be image-scanned by the imaging apparatus 20.

During the useful life of the automatic document feeder 22, the transparent material (e.g., Mylar®) of the scan window 36 typically becomes scratched or similarly damaged by the passing contact of the sheet media 28. These scratches and similar damage are substantially permanent, and tend to undesirably distort the original optical path followed by the light beam 60 and/or image beam 62, leading to errors or poor fidelity in the scan signals generated by the optical scanner 46. Such errors and poor fidelity in the scan signal can take the form of lines or streaks in the images, the appearance of spots or other images not actually present on the scanned sheet media. 28, illegibly distorted text or other indicia, etc.

Therefore, it is generally necessary to remove a damaged scan window 36 from the ADF 22 and replace it with a new, undamaged scan window from time-to-time, so as to maintain desirable performance (i.e., scan signal integrity) of the imaging apparatus 20. Embodiments of the present invention described hereafter address this replacement requirement.

Figure 2:
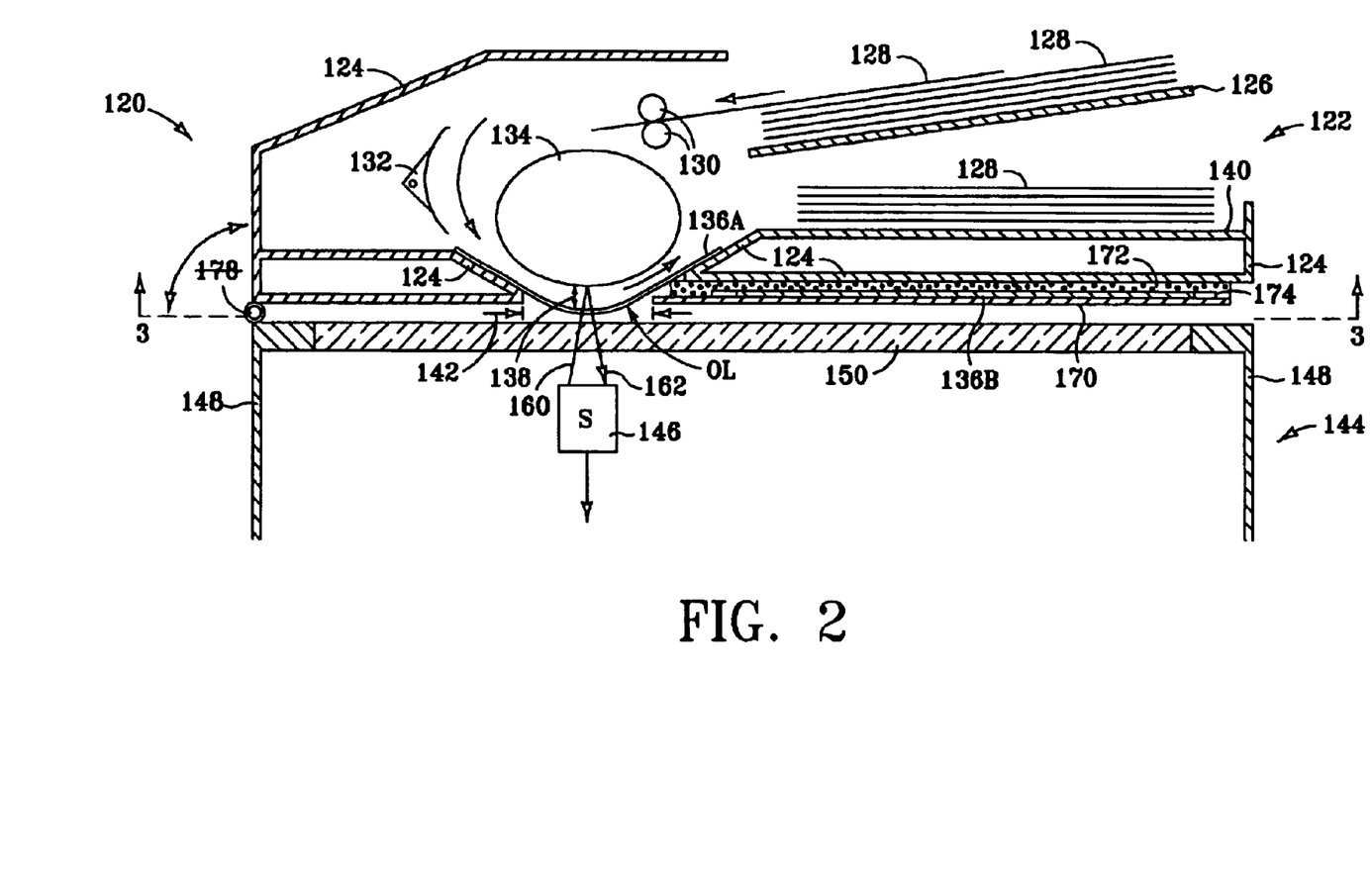
FIG. 2 is a partial side elevation sectional view depicting an imaging apparatus in accordance with an embodiment of the present invention.

FIG. 2 is a partial side elevation sectional view of an imaging apparatus 120 in accordance with one embodiment of the present invention. The imaging apparatus 120 includes an automatic document feeder 122 (ADF), and a partial view of an imaging device 144. The automatic document feeder 122 includes a housing 124, an input tray 126, sheet media 128, transport rollers 130, a curved guide 132, a media guide 134, and an output tray 140, which are defined, configured, and cooperative substantially as described above in regard to elements 24, 26, 28, 30, 32, 34 and 40, respectively, of the automatic document feeder 22 of FIG. 1.

Furthermore, the imaging device 144 includes an optical scanner 146, an imager housing 148, and a scan bed 150, which are defined, configured, and cooperative substantially as described above in regard to elements 46, 48, 50, 60, and 62, respectively, of the imaging device 44 of FIG. 1. The optical scanner can generate an emitted light beam 160 (similar to emitted light beam 60 described above with respect to FIG. 1), which can be reflected as an image beam 162 from sheet media 128 passing through passage gap 138 (described below). It is to be understood that the particular defining embodiment of the imaging device 144 is not pertinent within the context of the present invention, and that any imaging device 144 that can make use of an associated optical scanner 146 and an automatic document feeder 122 will suffice for purposes herein. Non-limiting examples of such an imaging device 144 include a multi-function printer, a photocopier, or a stand-alone document scanner. Other forms of imaging apparatus 144 can be used.

The automatic document feeder 122 further includes a flexible, transparent scan window 136A. The scan window 136A can be formed, for example, from Mylar®, or any other suitable material. The scan window 136 is supported by the housing 124, generally bridging a scan gap 142, and located in generally near-spaced proximity to the media guide 134, defining a passage gap 138. The scan window 136A is thus defined to be supported within the ADF 122 in an operative location "OL". During typical operation, the sheet media 128 pass through the passage gap 138, while being optically read (scanned) through the scan window 136A by the optical scanner 146 of the imaging device 144. This typical operation is substantially similar to the operation of the imaging apparatus 20 described above.

The automatic document feeder 122 further includes a cover 170. The cover 170 can be formed of any smooth, resilient material, such as, for example, plastic or Mylar®. Other flexible, generally smooth materials can be used to form the cover 170. The cover 170 is supported by the housing 124 of the ADF 122. The automatic document feeder 122 can further include a foam padding 172, which is supported by the cover 170. Typically, the foam padding can be formed from any number of generally smooth, pliable materials, such as, for example neoprene, or polyurethane foam.

Figure 3:
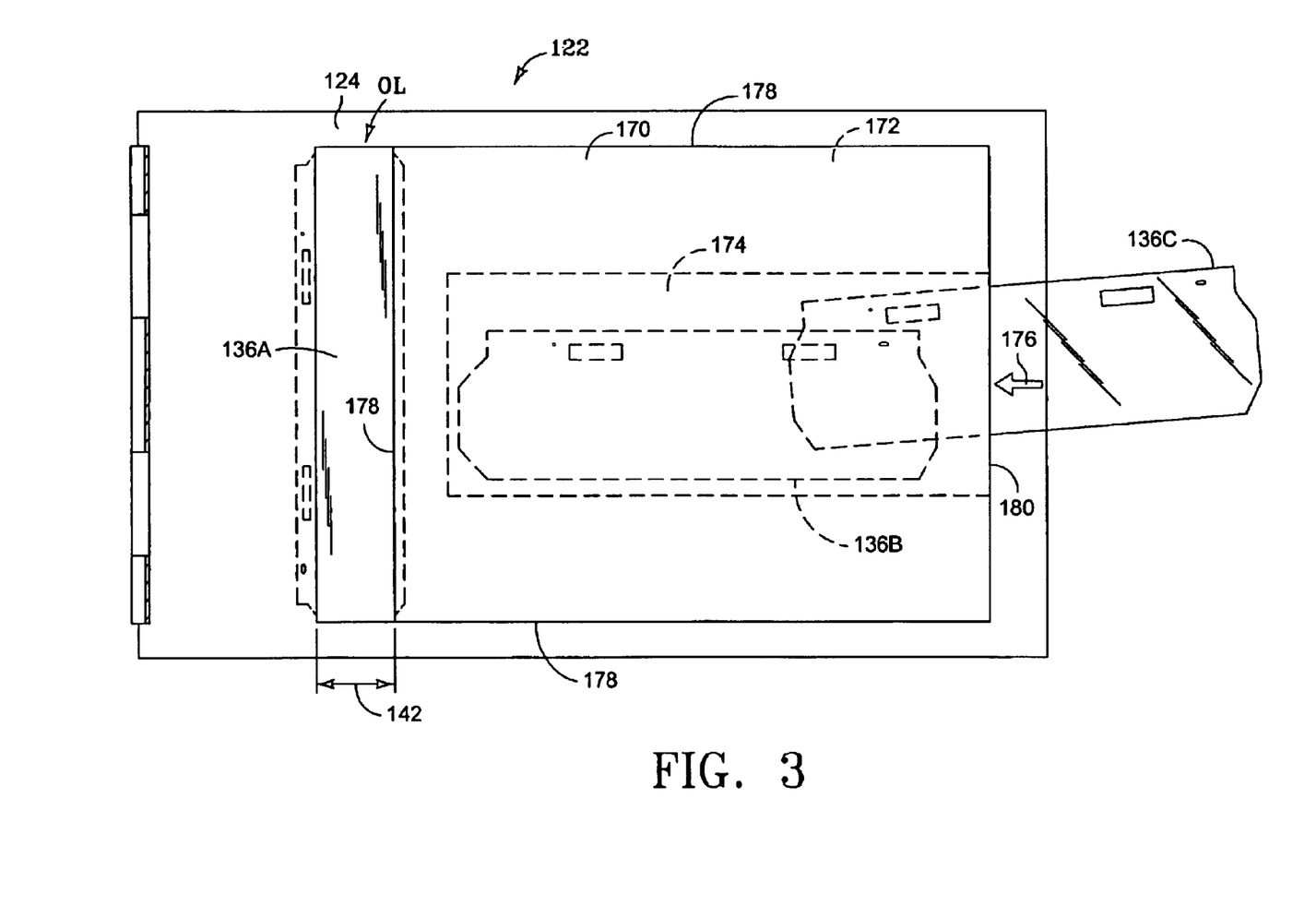
FIG. 3 is an underside plan view depicting an automatic document feeder in accordance with the embodiment of FIG. 2.

The housing 124, the cover 170, and the foam padding 172 are mutually coupled and cooperative so to define a storage compartment 174. The storage compartment 174 is generally defined by the shape of a pocket, and is configured to removably store one or more replacement scan windows, represented by replacement scan window 136B in FIG. 2, in a substantially non-damaging manner. In this way, the replacement scan window 136B is typically supported by the cover 170, with the foam padding 172 defining a plurality of side walls about the replacement scan window 136B, during storage within the storage compartment 174. Furthermore, the resilient nature of the cover 170 generally causes the overall storage compartment 174 arrangement to self-assume a substantially flat (i.e., non-bulging or non-sagging) condition, which is considered to be the closed or storage condition of the storage compartment 174. Attention is now directed to FIG. 3 for further understanding of the present invention.

FIG. 3 is an underside plan view of the automatic document feeder 122 of FIG. 2. As depicted in FIG. 3, the cover 170 is disposed in generally overlying alignment with the foam padding 172. Furthermore, the cover 170 and the foam padding 172 are generally continuously connected to the housing 124 of the ADF 122 along a plurality of mutual peripheral sides 178, through the use of cement or other suitable connecting means. The cover 170 and the foam padding 172 are further arranged to provide access to the storage compartment 174 along a mutual access side 180. Thus, the access side 180 of the cover 170 and the foam padding 172 is not connected to the housing 124. In this way, for example, a user can apply a suitable pulling or prying force to the access side 180, in a direction generally away from housing 124, so as to gain access to (i.e., open) the storage compartment 174. When such a pulling (opening) force is removed, the resilient nature of the cover 170 serves to return the storage compartment 174 arrangement to a substantially flat, non-sagging condition (i.e., closed or storage condition).

The storage compartment 174 can contain the replacement scan window 136B described above. Also as shown in FIG. 3, the storage compartment 174 has partially received another replacement scan window 136C. The depicted position of the replacement scan window 136C is provided to clarify the typical manner in which replacement scan windows 136B and 136C are slidingly inserted into and extracted from the storage compartment 174. Under normal storage conditions, the replacement scan window 136C will be fully received within the storage compartment 174, as depicted for the replacement scan window 136B. The scan window 136A (shown in the operative location "OL") and the replacement scan windows 136B and 136C are depicted as being substantially mutually identical, although materials can vary from one scan window unit to the next, if desired.

The automatic document feeder 122 further includes indicia 176, which is born by the housing 124. As shown, the indicia 176 is in the form of an arrow pointing toward the access side 180 of the storage compartment 174, so as to provide a user-visible indication as to the presence of, and point of access to, the replacement scan windows 136B and 136C within the storage compartment 174. Other indicia (not shown), including written instructions and/or user information, pertaining to, for example, extraction of a replacement scan window (e.g., 136B) from the storage compartment 174, or the installation of a replacement scan window within the operative location "OL", can also be provided. In another embodiment (not shown), such written instructions or user information can be provided by way of an electronic display borne by the imaging apparatus 120.

In this way, the replacement scan windows 136B and 136C are typically stored within the storage compartment 174, which is located relatively near to the operative location "OL", such that the scan window 136A can be readily replaced as required. It is to be understood that the storage compartment 174 is configured to removably store a plurality of replacement scan windows (e.g., 136B and 136C); in one embodiment, the cover 170, the foam padding 172, and the housing 124 are configured to define a storage compartment 174 that can satisfactorily store as many as five replacement scan windows. Other embodiments defining storage compartments 174 with different storage capacities can be used.

Figure 4:
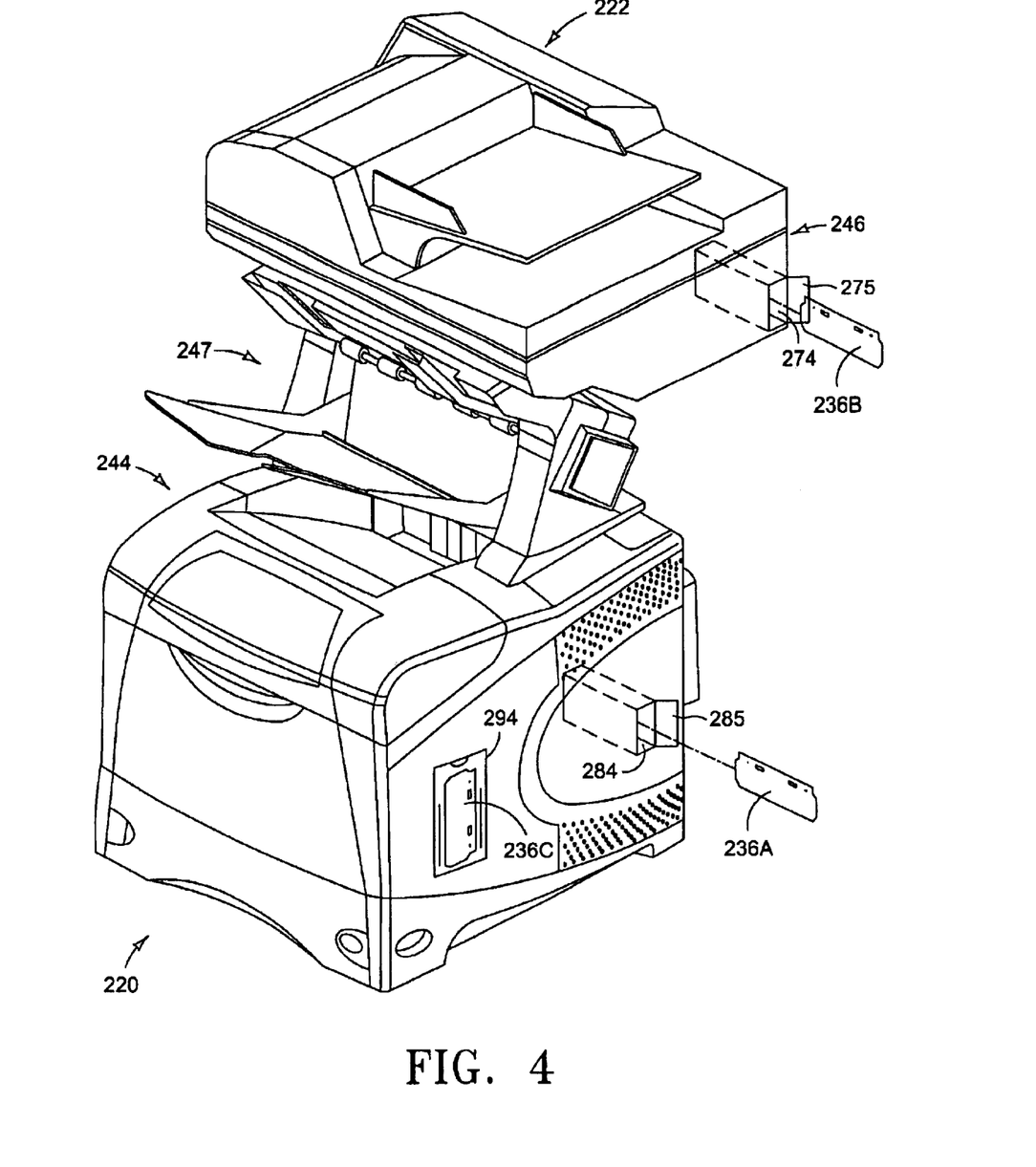
FIG. 4 is a perspective view depicting a multi-function printer in accordance with another embodiment of the present invention.

FIG. 4 is a perspective view of a multi-function printer 220 in accordance with another embodiment of the present invention. The multi-function printer 220 of FIG. 4 is intended to collectively depict at least some of the numerous replacement scan window storage compartments that are within the context of the present invention.

The multi-function printer 220 includes an automatic document feeder 222 (ADF), which supports and utilizes a flexible, transparent scan window (not shown in FIG. 4; see FIGS. 2–3). The ADF 222 is supported by a document scanner 246 that generally underlies the ADF 222. The ADF 222 and the document scanner 246 are cooperatively configured to scan sheet media (not shown; see FIG. 2), with the document scanner 246 being further configured to provide scan signals usable, for example, by a printer 244 described hereafter.

The document scanner 246 defines a storage compartment 274 and an associated door, or hatch, 275. The storage compartment 274 is configured to removably store at least one replacement scan window 236B, for use with the ADF 222, in a substantially non-damaging and conveniently located manner. The door 275 is user-operable between open and closed positions, permitting ready insertion and extraction of the replacement scan window 236B. Typically, the storage compartment 274 of the document scanner 246 is configured to selectively store a plurality of such replacement scan windows 236B.

The multi-function printer 220 further includes a sheet handling device 247, which is included for exemplary purposes only and is not specifically relevant to an understanding of the present invention.

The multi-function printer 220 also includes a printer 244, introduced above. The printer 244 is understood to be any generally suitable type of printer that can be used to generate indicia and images on sheet media, and can be, for example, a monochrome laser printer, a color laser printer, an ink-jet printer, etc. Other kinds of printer 244 can be used. Furthermore, the printer 244 is in scan signal communication with the document scanner 246 and can be used to generate photocopies or printed sheet media (not shown) corresponding to the image content of the sheet media (not shown) scanned by the document scanner 246. Other typical operations of the printer 244 can be performed.

The printer 244 defines a storage compartment 284 and an associated door 285. The storage compartment 284 is configured to removably store at least one replacement scan window 236A, for use with the ADF 222, in a substantially non-damaging manner. Generally, the storage compartment 284 is configured to selectively store a suitable plurality of such replacement scan windows 236A. The door 285 is user-operable between open and closed positions.

The printer 244 further includes a storage compartment 294. The storage compartment 294 is supported on the outer surface of the printer 244, and is generally defined by a pocket or pouch that has an open end. The storage compartment 294 can be formed, for example, of a transparent, flexible material such as polyvinyl, and is configured to removably store at least one replacement scan window 236C. The replacement scan windows 236A, 236B and 236C are substantially mutually identical, and each replacement scan window is usable with the automatic document feeder 222.

As shown, the multi-function printer 220 depicts a plurality of storage compartments 274, 284, and 294 that are respectively usable to selectively store one or more replacement scan windows (e.g., 236A) for replacement use purposes with the ADF 222. It is to be understood, however, that any particular embodiment (not shown) of the multi-function printer 220 typically includes just one such storage compartment (and an associated door, if applicable) for such replacement scan window storage purposes, and that a plurality of storage compartments is generally not needed. For example, a multi-function printer (not shown) can include just the storage compartment 294. In another example, a document scanner (not shown) that is not associated with a multi-function printer can include just the storage compartment 274 and its associated door 275. Other embodiments of the present invention (not shown) that are generally depicted within FIG. 4 can also be used. Thus, the present invention encompasses a number of different storage compartments for removably storing replacement scan windows for use with an automatic document feeder.

Figure 5:
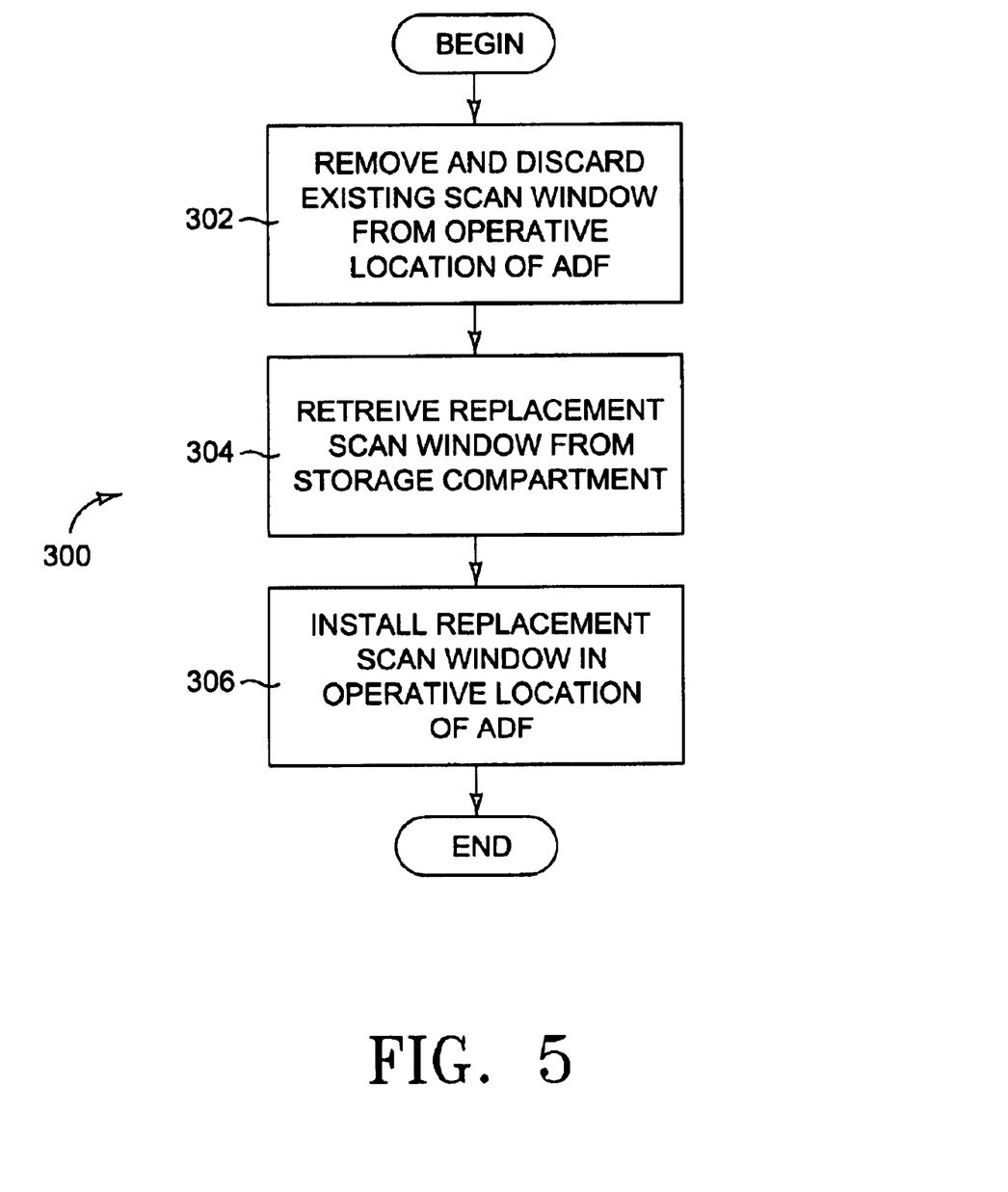
FIG. 5 is a flowchart depicting a method of using the present invention.

FIG. 5 is a flowchart of a method 300, which is understood to be applicable to using any particular embodiment of the present invention previously described. Reference is also made to various elements of FIGS. 2 and 3 for clarity of understanding of the method depicted by flowchart 300 of FIG. 5, although it is understood that the method is not constrained by any of the embodiments depicted in FIGS. 2–4.

In step 302 of the flowchart 300 of FIG. 5, the existing (operative) scan window 136A (FIG. 2) is assumed to be damaged and is removed from the operative location OL of the ADF 122 and discarded.

In step 304 (FIG. 5), the replacement scan window 136C (FIG. 3) is retrieved from the storage compartment 174, making use of the indicia 176 as needed.

In step 306 (FIG. 5), the replacement scan window 136C (FIG. 3) is installed (supported) in the operative location "OL" of the ADF 122. The ADF 122 is now usable for normal operations.

Therefore, a number of storage compartments for use in storing scan windows of automatic document feeders have been provided. The location and configuration of such a storage compartment generally results in a scan window replacement procedure that is less time consuming and burdensome on a user than typical procedures of the prior art.

We claim:

1. An automatic document feeder, comprising:

a housing; and a cover supported by the housing, wherein the cover and the housing are configured to define a storage compartment, the storage compartment is configured to removably store at least one scan window, the at least one scan window is configured for use with the automatic document feeder, and wherein the cover is further configured such that the storage compartment is selectively openable and closeable in response to a user input.

2. The automatic document feeder of claim 1, and further comprising at least one scan window removably stored within the storage compartment.

3. An automatic document feeder, comprising:

a housing; and a cover supported by the housing, wherein the cover and the housing are configured to define a storage compartment, the storage compartment is configured to removably store at least one scan window, the at least one scan window is configured for use with the automatic document feeder, and wherein the cover is further configured such that the storage compartment is selectively openable and closeable in respective response to the application and removal of force by a human finger.

4. An automatic document feeder, comprising:

a housing;

a cover supported by the housing, wherein the cover and the housing are configured to define a storage compartment, the storage compartment is configured to removably store at least one scan window, the at least one scan window is configured for use with the automatic document feeder; and a foam padding supported by the cover, and wherein the foam padding is configured to define a plurality of side walls about the at least one scan window during the removable storage of the at least one scan window by the storage compartment.

5. An automatic document feeder, comprising:

a housing:

a cover supported by the housing, wherein the cover and the housing are configured to define a storage compartment, the storage compartment is configured to removably store at least one scan window, and wherein the at least one scan window is configured for use with the automatic document feeder; and indicia borne by the automatic document feeder, and wherein the indicia is configured to provide user information corresponding to at least one of alerting a user to the presence of the storage compartment, opening the storage compartment, retrieving the at least one scan window from the storage compartment, or using the at least one scan window with the automatic document feeder.

6. A document scanner, comprising:

an automatic document feeder including an operative scan window; and a storage compartment defined by the document scanner and configured to non-damagingly removably store at least one replacement scan window, and wherein the at least one replacement scan window is configured to selectively replace the operative scan window.

7. The document scanner of claim 6, and further comprising a body of the document scanner, and wherein the body of the document scanner defines the storage compartment.

8. The document scanner of claim 7, and wherein the body of the document scanner further defines a selectively operable door of the storage compartment.

9. The document scanner of claim 6, and further comprising a body of the automatic document feeder, and wherein the body of the automatic document scanner defines the storage compartment.

10. The document scanner of claim 9, and wherein the body of the automatic document feeder further defines a selectively operable door of the storage compartment.

11. The document scanner of claim 6, and further comprising indicia borne by the document scanner, and wherein the indicia is configured to provide user information corresponding to at least one of alerting a user to the presence of the storage compartment, retrieving the at least one scan window from the storage compartment, or replacing the operative scan window with the at least one replacement scan window.

12. The document scanner of claim 6, and further comprising a pocket of the document scanner, and wherein the pocket defines the storage compartment.

13. The document scanner of claim 6, and further comprising at least one replacement scan window removably stored within the storage compartment.

14. A multi-function printer, comprising:

a document scanner including an automatic document feeder;

an operative scan window supported within the automatic document feeder; and a storage compartment defined by the multi-function printer, wherein the storage compartment is configured to non-damagingly removably store at least one replacement scan window, and wherein the at least one replacement scan window is configured to selectively replace the operative scan window supported within the automatic document feeder.

15. The multi-function printer of claim 14, and further comprising a body of the multi-function printer, and wherein the body of the multi-function printer defines the storage compartment.

16. The multi-function printer of claim 15, and wherein the body of the multi-function printer further defines a selectively operable door of the storage compartment.

17. The multi-function printer of claim 14, and further comprising a body of the document scanner, and wherein the body of the document scanner defines the storage compartment.

18. The multi-function printer of claim 17, and wherein the body of the document scanner further defines a selectively operable door of the storage compartment.

19. The multi-function printer of claim 14, and further comprising a body of the automatic document feeder, and wherein the body of the automatic document feeder defines the storage compartment.

20. The multi-function printer of claim 19, and wherein the body of the automatic document feeder further defines a selectively operable door of the storage compartment.

21. The multi-function printer of claim 14, and further comprising at least one replacement scan window removably stored within the storage compartment.

22. The multi-function printer of claim 14, and further comprising indicia borne by the multi-function printer and configured to provide use information corresponding to at least one of alerting a user to the presence of the storage compartment, retrieving the at least one replacement scan window from the storage compartment, or replacing the operative scan window with the at least one replacement scan window.

23. The multi-function printer of claim 15, and further comprising a pocket of the multi-function printer, and wherein the pocket defines the storage compartment.

24. A method for use with an automatic document feeder, comprising the following steps completed in any suitable order:

storing a replacement scan window within a storage compartment of the automatic document feeder;

removing an existing scan window from an operational location of the automatic document feeder;

retrieving the replacement scan window from the storage compartment; and installing the replacement scan window in the operational location of the automatic document feeder.

25. The method of claim 24, and further comprising viewing indicia borne by the automatic document feeder, and thereafter performing at least one of the removing, the extracting, or the installing in correspondence to viewing the indicia.

26. The method of claim 24, and further comprising opening a cover of the storage compartment prior to, and closing the cover after, the extracting the replacement scan window from the storage compartment.

* * * * *